(12) United States Patent
Frankel et al.

(10) Patent No.: US 7,788,589 B2
(45) Date of Patent: Aug. 31, 2010

(54) METHOD AND SYSTEM FOR IMPROVED ELECTRONIC TASK FLAGGING AND MANAGEMENT

(75) Inventors: Glenn L. Frankel, Atlanta, GA (US);
Stephen D. Jensen, Monroe, WA (US);
Richard H. Leukart, Seattle, WA (US);
Hernan Savastano, Seattle, WA (US);
Cheryl L. Williams, Redmond, WA (US); Melissa R. MacBeth, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 605 days.

(21) Appl. No.: 10/955,232

(22) Filed: Sep. 30, 2004

(65) Prior Publication Data

US 2006/0074844 A1 Apr. 6, 2006

(51) Int. Cl.
*G06F 3/00* (2006.01)
(52) U.S. Cl. .................. 715/752; 715/751; 715/853; 715/810; 709/204; 709/205; 709/206; 709/207
(58) Field of Classification Search .............. 715/810, 715/751–753; 707/1; 709/204–207
See application file for complete search history.

(56) References Cited

U.S. PATENT DOCUMENTS

| 5,202,828 | A | 4/1993 | Vertelney et al. ............ 714/810 |
| 5,493,692 | A | 2/1996 | Theimer et al. |
| 5,530,794 | A | 6/1996 | Luebbert ..................... 715/524 |
| 5,537,628 | A | 7/1996 | Luebbert ..................... 715/524 |
| 5,544,321 | A | 8/1996 | Theimer et al. |
| 5,555,376 | A | 9/1996 | Theimer et al. |
| 5,563,996 | A | 10/1996 | Tchao ......................... 715/521 |
| 5,596,656 | A | 1/1997 | Goldberg ..................... 382/186 |
| 5,603,054 | A | 2/1997 | Theimer et al. |
| 5,611,050 | A | 3/1997 | Theimer et al. |
| 5,625,783 | A | 4/1997 | Ezekiel et al. .............. 395/352 |
| 5,625,810 | A | 4/1997 | Kurosu et al. |
| 5,701,424 | A | 12/1997 | Atkinson ..................... 715/808 |
| 5,724,595 | A | 3/1998 | Gentner |
| 5,734,915 | A | 3/1998 | Roewer ....................... 395/773 |

(Continued)

FOREIGN PATENT DOCUMENTS

EP 0569133 A2 11/1993

(Continued)

OTHER PUBLICATIONS

Gordon Padwick, Ebook titled "Special Edition Using Microsoft Outlook 2002", published May 17, 2001; pp. 1-7.*

(Continued)

*Primary Examiner*—Weilun Lo
*Assistant Examiner*—Tuyetlien T Tran
(74) *Attorney, Agent, or Firm*—Merchant & Gould

(57) ABSTRACT

An improved method and system are provided for creating tasks and for inputting information associated with created tasks according to an electronic task management application or system. Electronic correspondence items may be flagged as tasks. Upon flagging an individual electronic correspondence item, a corresponding task is created for the flagged item, and the created task is then populated into and exposed by one or more applications used for displaying tasks such as a tasks application, calendar application, or electronic to-do list application. Properties such as task start dates and task categories may be applied to the created task, as desired.

36 Claims, 6 Drawing Sheets

U.S. PATENT DOCUMENTS

| | | | |
|---|---|---|---|
| 5,752,254 A | 5/1998 | Sakairi | 715/530 |
| 5,760,768 A | 6/1998 | Gram | 345/333 |
| 5,761,683 A | 6/1998 | Logan et al. | |
| 5,765,156 A | 6/1998 | Guzak et al. | 707/100 |
| 5,778,346 A * | 7/1998 | Frid-Nielsen et al. | 705/9 |
| 5,781,192 A | 7/1998 | Kodimer | 715/770 |
| 5,798,760 A | 8/1998 | Vayda et al. | 715/834 |
| 5,801,693 A | 9/1998 | Bailey | 715/769 |
| 5,812,865 A | 9/1998 | Theimer et al. | |
| 5,838,321 A | 11/1998 | Wolf | 345/343 |
| 5,855,006 A * | 12/1998 | Huemoeller et al. | 705/9 |
| 5,870,552 A | 2/1999 | Dozier et al. | 715/234 |
| 5,884,306 A * | 3/1999 | Bliss et al. | 707/7 |
| 5,898,434 A | 4/1999 | Small et al. | 715/810 |
| 5,924,099 A | 7/1999 | Guzak et al. | 707/100 |
| 5,940,078 A | 8/1999 | Nagarajayya et al. | 345/346 |
| 5,958,008 A | 9/1999 | Pogrebisky et al. | |
| 5,970,455 A | 10/1999 | Wilcox et al. | 704/270 |
| 5,970,466 A * | 10/1999 | Detjen et al. | 705/8 |
| 5,999,938 A | 12/1999 | Bliss et al. | 707/102 |
| 6,002,402 A | 12/1999 | Schacher | 715/810 |
| 6,025,837 A | 2/2000 | Matthews, III et al. | |
| 6,034,686 A | 3/2000 | Lamb et al. | 715/810 |
| 6,057,845 A | 5/2000 | Dupouy | 715/863 |
| 6,065,012 A * | 5/2000 | Balsara et al. | 707/102 |
| 6,177,939 B1 | 1/2001 | Blish et al. | 715/770 |
| 6,233,591 B1 | 5/2001 | Sherman et al. | |
| 6,249,283 B1 | 6/2001 | Ur | 715/764 |
| 6,262,724 B1 | 7/2001 | Crow et al. | 715/723 |
| 6,269,389 B1 | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,282,548 B1 | 8/2001 | Burner et al. | 715/234 |
| 6,308,201 B1 | 10/2001 | Pivowar et al. | 709/214 |
| 6,309,305 B1 | 10/2001 | Kraft | 455/566 |
| 6,310,622 B1 | 10/2001 | Asente | 345/441 |
| 6,310,634 B1 * | 10/2001 | Bodnar et al. | 715/854 |
| 6,321,242 B1 | 11/2001 | Fogg et al. | |
| 6,389,434 B1 | 5/2002 | Rivette et al. | 715/209 |
| 6,411,311 B1 | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,448,987 B1 | 9/2002 | Easty et al. | 715/834 |
| 6,459,441 B1 | 10/2002 | Perroux et al. | |
| 6,466,232 B1 | 10/2002 | Newell et al. | |
| 6,490,634 B2 | 12/2002 | Coiner | 719/329 |
| 6,499,041 B1 | 12/2002 | Breslau et al. | 715/505 |
| 6,513,046 B1 | 1/2003 | Abbott, III et al. | |
| 6,549,219 B2 | 4/2003 | Selker | 715/834 |
| 6,549,915 B2 | 4/2003 | Abbott, III et al. | |
| 6,572,660 B1 | 6/2003 | Okamoto | |
| 6,606,653 B1 | 8/2003 | Ackermann et al. | |
| 6,618,732 B1 | 9/2003 | White | |
| 6,651,059 B1 | 11/2003 | Sundaresan et al. | |
| 6,686,938 B1 | 2/2004 | Jobs et al. | 345/835 |
| 6,694,087 B1 | 2/2004 | Weaver | 386/52 |
| 6,704,770 B1 | 3/2004 | Ramakesavan | 709/205 |
| 6,708,202 B1 * | 3/2004 | Shuman et al. | 709/206 |
| 6,735,247 B2 | 5/2004 | Lundby | 382/282 |
| 6,747,675 B1 | 6/2004 | Abbott et al. | |
| 6,751,777 B2 | 6/2004 | Bates et al. | |
| 6,763,496 B1 | 7/2004 | Hennings et al. | |
| 6,789,228 B1 | 9/2004 | Merril et al. | 715/500.1 |
| 6,791,580 B1 | 9/2004 | Abbott et al. | |
| 6,801,223 B1 | 10/2004 | Abbott et al. | |
| 6,802,041 B1 | 10/2004 | Rehm | |
| 6,810,405 B1 | 10/2004 | LaRue et al. | 707/201 |
| 6,812,937 B1 | 11/2004 | Abbott et al. | |
| 6,826,729 B1 | 11/2004 | Giesen et al. | 715/837 |
| 6,836,270 B2 | 12/2004 | Du | 345/419 |
| 6,842,877 B2 | 1/2005 | Robarts et al. | |
| 6,848,075 B1 | 1/2005 | Becker et al. | |
| 6,918,091 B2 | 7/2005 | Leavitt et al. | 715/765 |
| 6,924,797 B1 | 8/2005 | MacPhail | 345/326 |
| 6,925,496 B1 | 8/2005 | Ingram et al. | |
| 6,944,821 B1 | 9/2005 | Bates et al. | 715/530 |
| 6,970,867 B1 | 11/2005 | Hsu et al. | |
| 7,032,210 B2 | 4/2006 | Alloing et al. | 717/106 |
| 7,039,234 B2 | 5/2006 | Geidl et al. | 382/187 |
| 7,114,128 B2 | 9/2006 | Koppolu et al. | |
| 7,143,338 B2 | 11/2006 | Bauchot et al. | 715/503 |
| 7,165,098 B1 * | 1/2007 | Boyer et al. | 709/219 |
| 7,184,955 B2 | 2/2007 | Obrador et al. | 704/231 |
| 7,185,050 B2 | 2/2007 | Eld et al. | |
| 7,188,073 B1 * | 3/2007 | Tam et al. | 705/9 |
| 7,210,107 B2 | 4/2007 | Wecker et al. | 715/863 |
| 7,254,785 B2 | 8/2007 | Reed | 715/834 |
| 7,406,501 B2 | 7/2008 | Szeto et al. | |
| 7,454,763 B2 | 11/2008 | Veselova et al. | 719/329 |
| 7,460,713 B2 | 12/2008 | Lapstun et al. | 382/187 |
| 7,555,707 B1 | 6/2009 | Labarge et al. | |
| 7,707,518 B2 | 4/2010 | Veselova | |
| 7,712,049 B2 | 5/2010 | Williams et al. | |
| 2001/0032214 A1 | 10/2001 | Bauchot et al. | 707/503 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0026478 A1 | 2/2002 | Rodgers et al. | 709/205 |
| 2002/0032689 A1 | 3/2002 | Abbott, III et al. | |
| 2002/0044152 A1 | 4/2002 | Abbott, III et al. | |
| 2002/0049785 A1 | 4/2002 | Bauchot | 707/503 |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078180 A1 | 6/2002 | Miyazawa | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087534 A1 | 7/2002 | Blackman et al. | 707/4 |
| 2002/0087642 A1 | 7/2002 | Wei et al. | |
| 2002/0088008 A1 | 7/2002 | Markel | 725/135 |
| 2002/0089540 A1 | 7/2002 | Geier et al. | 345/764 |
| 2002/0091739 A1 | 7/2002 | Ferlitsch et al. | 707/526 |
| 2002/0099777 A1 * | 7/2002 | Gupta et al. | 709/206 |
| 2002/0099817 A1 | 7/2002 | Abbott et al. | |
| 2002/0120697 A1 | 8/2002 | Generous et al. | |
| 2002/0133520 A1 | 9/2002 | Tanner | |
| 2002/0138582 A1 | 9/2002 | Chandra et al. | |
| 2002/0140731 A1 | 10/2002 | Subramaniam et al. | |
| 2002/0161800 A1 | 10/2002 | Eld et al. | |
| 2002/0161804 A1 | 10/2002 | Chiu et al. | |
| 2002/0184264 A1 | 12/2002 | Berg et al. | 707/513 |
| 2002/0196293 A1 | 12/2002 | Suppan et al. | 345/853 |
| 2003/0013483 A1 | 1/2003 | Ausems et al. | |
| 2003/0014395 A1 | 1/2003 | Ruvolo et al. | 707/3 |
| 2003/0014490 A1 * | 1/2003 | Bates et al. | 709/206 |
| 2003/0020749 A1 * | 1/2003 | Abu-Hakima et al. | 345/752 |
| 2003/0023755 A1 | 1/2003 | Harris et al. | 709/246 |
| 2003/0046401 A1 | 3/2003 | Abbott et al. | |
| 2003/0050927 A1 | 3/2003 | Hussam | 707/5 |
| 2003/0069877 A1 | 4/2003 | Grefenstette et al. | 707/2 |
| 2003/0070143 A1 | 4/2003 | Maslov | |
| 2003/0076352 A1 | 4/2003 | Uhlig et al. | |
| 2003/0084104 A1 | 5/2003 | Salem et al. | |
| 2003/0088534 A1 * | 5/2003 | Kalantar et al. | 706/50 |
| 2003/0097361 A1 | 5/2003 | Huang et al. | |
| 2003/0100999 A1 | 5/2003 | Markowitz | 702/20 |
| 2003/0135565 A1 * | 7/2003 | Estrada | 709/206 |
| 2003/0154254 A1 * | 8/2003 | Awasthi | 709/206 |

| | | | | | | |
|---|---|---|---|---|---|---|
| 2003/0154476 A1 | 8/2003 | Abbott, III et al. | | 2006/0150109 A1 | 7/2006 | Schultz et al. |
| 2003/0172168 A1 | 9/2003 | Mak et al. | | 2006/0195461 A1 | 8/2006 | Lo et al. |
| 2003/0172384 A1 | 9/2003 | Comps | | 2007/0022372 A1 | 1/2007 | Liu et al. |
| 2003/0182450 A1 | 9/2003 | Ong et al. ................... 709/246 | | 2007/0124325 A1 | 5/2007 | Moore et al. |
| 2003/0187930 A1 | 10/2003 | Ghaffar et al. | | 2007/0156627 A1 | 7/2007 | D'Alicandro |
| 2003/0196196 A1 | 10/2003 | Nylander et al. | | 2007/0156643 A1 | 7/2007 | Sareen et al. |
| 2003/0212680 A1* | 11/2003 | Bates et al. ..................... 707/7 | | 2007/0168278 A1 | 7/2007 | Peterson et al. |
| 2003/0222899 A1 | 12/2003 | Alvesalo | | 2007/0168378 A1 | 7/2007 | Dev Sareen et al. |
| 2004/0001093 A1 | 1/2004 | Sellers et al. | | 2007/0245223 A1 | 10/2007 | Siedzik et al. ........... 715/500.1 |
| 2004/0039779 A1* | 2/2004 | Amstrong et al. ........... 709/204 | | 2007/0245229 A1 | 10/2007 | Siedzik et al. .............. 715/512 |
| 2004/0054736 A1 | 3/2004 | Daniell et al. | | 2008/0115048 A1 | 5/2008 | Veselova et al. |
| 2004/0063400 A1 | 4/2004 | Kim | | 2008/0115069 A1 | 5/2008 | Veselova et al. |
| 2004/0073679 A1 | 4/2004 | Martens et al. ............. 709/227 | | | | |
| 2004/0098398 A1 | 5/2004 | Ahn et al. | | | FOREIGN PATENT DOCUMENTS | |
| 2004/0109033 A1 | 6/2004 | Vienneau et al. ............ 345/863 | | EP | 0 986 011 A2 | 3/2000 |
| 2004/0128613 A1 | 7/2004 | Sinisi | | EP | 1 223 503 A2 | 7/2002 |
| 2004/0153445 A1 | 8/2004 | Horvitz et al. | | EP | 1 376 337 A1 | 2/2004 |
| 2004/0158611 A1 | 8/2004 | Daniell et al. | | EP | 1 630 694 A2 | 3/2006 |
| 2004/0168119 A1 | 8/2004 | Liu et al. .................. 715/501.1 | | GB | 2 391 148 A | 1/2004 |
| 2004/0172455 A1 | 9/2004 | Green et al. | | JP | 2001-265753 A | 9/2001 |
| 2004/0174392 A1 | 9/2004 | Bjoernsen et al. | | WO | WO 98/00787 A1 | 8/1998 |
| 2004/0177122 A1 | 9/2004 | Appleman et al. | | WO | WO 2004/038548 A2 | 5/2004 |
| 2004/0177319 A1 | 9/2004 | Horn ....................... 715/501.1 | | WO | WO 2004/086254 A | 10/2004 |
| 2004/0189694 A1 | 9/2004 | Kurtz et al. | | WO | WO 2005001709 A2 | 1/2005 |
| 2004/0194025 A1 | 9/2004 | Hubert et al. | | WOWO | 2004/038548 | |
| 2004/0221243 A1 | 11/2004 | Twerdahl et al. ............ 715/834 | | | A3RA | 4/2005 |
| 2004/0230599 A1 | 11/2004 | Moore et al. | | WO | WO 2005/067328 A1 | 7/2005 |
| 2004/0243677 A1* | 12/2004 | Curbow et al. .............. 709/206 | | WO | WO 2005/110010 A2 | 11/2005 |
| 2004/0243941 A1 | 12/2004 | Fish | | WO | WO 2007/081783 A2 | 7/2007 |
| 2004/0267625 A1 | 12/2004 | Feng et al. | | WO | WO 2007/081783 A3 | 7/2007 |
| 2004/0267706 A1 | 12/2004 | Springer et al. ............. 707/903 | | WO | WO 2007/081786 A2 | 7/2007 |
| 2004/0268231 A1 | 12/2004 | Tunning | | WO | WO 2007/081786 A3 | 7/2007 |
| 2004/0268263 A1 | 12/2004 | Van Dok et al. | | | | |
| 2005/0004989 A1 | 1/2005 | Satterfield et al. | | | OTHER PUBLICATIONS | |

2005/0004990 A1 1/2005 Durazo et al.
2005/0005235 A1 1/2005 Satterfield et al.
2005/0005249 A1 1/2005 Hill et al.
2005/0010871 A1 1/2005 Ruthfield et al. ............ 715/712
2005/0034078 A1 2/2005 Abbott et al.
2005/0055424 A1 3/2005 Smith ......................... 709/219
2005/0064852 A1 3/2005 Baldursson
2005/0097465 A1 5/2005 Giesen et al.
2005/0102365 A1 5/2005 Moore et al.
2005/0102607 A1 5/2005 Rousselle et al.
2005/0102639 A1 5/2005 Dove
2005/0108619 A1 5/2005 Theall et al.
2005/0114521 A1 5/2005 Lee
2005/0119018 A1 6/2005 Kim
2005/0125717 A1 6/2005 Segal et al.
2005/0149851 A1 7/2005 Mittal
2005/0154761 A1 7/2005 Lee et al.
2005/0165795 A1 7/2005 Myka et al.
2005/0166154 A1 7/2005 Wilson et al.
2005/0175089 A1 8/2005 Jung
2005/0183008 A1 8/2005 Crider et al. ................. 715/517
2005/0208962 A1 9/2005 Kim
2005/0233744 A1 10/2005 Karaoguz
2005/0240590 A1 10/2005 Shimizu et al.
2005/0245241 A1 11/2005 Durand
2005/0286414 A1 12/2005 Young et al. ................. 370/216
2005/0289109 A1 12/2005 Arrouye et al. ................ 707/1
2006/0036945 A1 2/2006 Radtke et al.
2006/0036950 A1 2/2006 Himberger et al.
2006/0036965 A1 2/2006 Harris et al.
2006/0047704 A1 3/2006 Gopalakrishnan ........ 707/104.1
2006/0053379 A1 3/2006 Henderson et al.
2006/0069603 A1 3/2006 Williams et al.
2006/0069604 A1 3/2006 Leukart et al.
2006/0069617 A1 3/2006 Milener et al. ........... 715/501.1
2006/0075347 A1 4/2006 Rehm
2006/0075360 A1 4/2006 Bixler ....................... 715/805
2006/0095452 A1 5/2006 Jansson et al.
2006/0139709 A1 6/2006 Bifano et al.

Young et al, "Microsoft Office System Inside Out: 2003 Edition", published Sep. 10, 2003, relevant pp. 1-168.*
U.S. Final Office Action dated Feb. 7, 2007 cited in U.S. Appl. No. 10/387,287.
U.S. Office Action dated Feb. 20, 2007 cited in U.S. Appl. No. 10/420,621.
Charles Rich, Candace L. Sidner, "Segmented Interaction History in a Collaborative Interface Agent," 1997 ACM, pp. 23-30.
Andrew Dwelly, "Functions and Dynamic User Interfaces, " 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces, " 1996 ACM, pp. 21-30.
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
"Primary Windows," http://www-03.ibm.com/servers/eserver/iseries/navigator/guidelines/primary.html (23 pages).
"User Interface Standards," http://msdn2.microsoftt.com/en-us/library/aa217660(office.11,d=printer).aspx, Sep. 2001 (5 pages).
"WebSphere Studio Overview," http://researchweb.watson.ibm.com/journal/sj/432/budinsky.html, May 6, 2004 (25 pages).
U.S. Final Office Action dated Oct. 24, 2006 cited in U.S. Appl. No. 10/664,740.
U.S. Appl. No. 10/420,621, filed Apr. 22, 2003, entitled "Creation and Recognition of Specially-Marked Items in Notes".
U.S. Appl. No. 10/387,287, filed Mar. 12, 2003, entitled "System and Method for Customizing Note Flags".

U.S. Appl. No. 10/397,103, filed Mar. 27, 2003, entitled "System and Method for Linking Page Content with a Media File and Displaying the Links".
U.S. Appl. No. 10/664,740, filed Sep. 18, 2003, entitled "Method and System for Providing Data Reference Information".
U.S. Appl. No. 11/063,309, filed Feb. 22, 2005, entitled "System and Method for Linking Page Content with a Video Media File and Displaying the Links".
U.S. Official Action mailed Oct. 19, 2004 in U.S. Appl. No. 10/397,103.
U.S. Official Action mailed Sep. 23, 2005 in U.S. Appl. No. 10/420,621.
U.S. Official Action mailed Mar. 6, 2006 in U.S. Appl. No. 10/664,740.
U.S. Official Action mailed Jun. 12, 2006 in U.S. Appl. No. 10/387,287.
U.S. Official Action mailed Jun. 13, 2006 in U.S. Appl. No. 10/420,621.
Microsoft Corporation, "Microsoft Snipping Tool for Tablet PC Preview Release Help: Capturing Clips; Capturing Regions; Displaying or Hiding Links", Nov. 2002, 4 pp.
Leszynski Group, "News Story: Leszynski Group Powers Bill Gates' Tablet PC Launch Keynote", Nov. 2002, 1 pp.
Leszynski Group, "Tablet PC Solutions", Nov. 2002, 3 pp.
IBM Corporation, "Dragging Marked Data to an Editor Window", Technical Disclosure Bulletin, Mar. 1992, vol. 34, No. 10B, pp. 202-203.
IBM Corporation, "Source Dimension Copying Using the Standard Clipboard", Technical Disclosure Bulletin, Aug. 1994, vol. 37, No. 8, pp. 419-420.
IBM Corporation, "Multiple Item On-Line Clipboard", Technical Disclosure Bulletin, Jul. 1992, No. 2, pp. 425.
Apperley, M. et al., "Breaking the Copy/Paste Cycle: The Stretchable Selection Tool", Computer Science Department, New Zealand, Feb. 2000, pp. 1-8.
"Evermore integrated Office if the 'First REAL Office'", Evermore Software Ltd., 2001-2004, retrieved Jan. 24, 2007, http://web.arehive.org/web/20040106195344/www.evermoresw,com/weben/product/eio_..., 2 pp.
U.S. Office Action dated May 12, 2008 cited in U.S. Appl. No. 10/397,103.
"Setting Reminders in Outlook", California Lutheran University Information Systems and Services, Nov. 2005, 3 pp.
Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.
Gnome 2.8 Desktop User Guide, Sun Gnome Documentation Team, 2004, 67 pp.
Braun, Owen, "Owen Braun: OneNote 12: Linking related notes together (really)", Date: Oct. 6, 2005, http://blogs.msdn.com/owen_braun/archive/2005/10/06/477615.aspx, 6 pp.
Braun, Owen, "Owen Braun: OneNote 12: Linking related notes together", Date: Oct. 6, 2005, http://blogs.msdn.com/owen_braun/archive/2005/10/06/477610.aspx, 2 pp.
Braun, Owen, "Owen Braun: OneNote 12: New Extensibility in OneNote 12", Date: Oct. 6, 2005, http://blogs.msdn.com/owen_braun/archive/2005/12/15/503879.aspx, 2 pp.
"SOHO Notes Tour: Note-Taking", http://www.chronosnet.com/Products/sohonotes/sn_notetaking.html, Date Unknown, 3 pp.
Henzinger, Monica, "Link Analysis in Web Information Retrieval", Date: 2000, http://www.acm.org/sigs/sigmod/disc/disc01/out/websites/deb_september/henzinge.pdf, 6 pp.
"Accessibility Essentials 2 Authoring Accessible Documents—Inserting Hyperlinks: Linking internally within a document", http://www.techdis.ac.uk/resources/sites/accessibilityessentials2/modules/authoring%20accessible%20docs/hyperlink%20internally.html, Date Unknown, 4 pp.
"Tomboy: Simple Note Taking", Date: 2004-2006, http://www.beatniksoftware.com/tomboy/, 4 pp.
U.S. Official Action mailed Feb. 21, 2008 cited in U.S. Appl. No. 11/326,110.
U.S. Official Action mailed Mar. 5, 2008 cited in U.S. Appl. No. 11/326,583.
U.S. Final Official Action mailed Jul. 9, 2008 cited in U.S. Appl. No. 10/387,287.
U.S. Final Office Action dated Dec. 10, 2008 cited in U.S. Appl. No. 11/326,583.
U.S. Office Action dated Dec. 24, 2008 cited in U.S. Appl. No. 10/420,621.
PCT Search Report mailed Jun. 22, 2007 in International Application No. PCT/US2007/000248.
PCT Search Report mailed Jun. 22, 2007 in International Application No. PCT/US2007/000244.
Chinese First Office Action mailed Oct. 31, 2008 cited in Chinese Application No. 200510088531.1.
U.S. Office Action dated Nov. 17, 2008 cited in U.S. Appl. No. 11/326,110.
Kraynak, Joe, "Absolute Beginner's Guide to Microsoft Office Excel 2003," Sep. 2003, 14 pgs.
Baker, Richard, "Microsoft Office 2004 for Mac in a Snap," Aug. 2004, 17 pgs.
European Search Report mailed Jan. 21, 2009 cited in Application No. 07717882.0-1527/1977340.
European Search Report mailed Jan. 21, 2009 cited in Application No. 07717837.4-1527/1977339.
"Microsoft Office 2003 Editions Product Guide," Internet Publication, Sep. 2003, XP002511239, 167 pgs., http://www.jmu.edu/computing/news/archive/issues/2003guide.pdf.
U.S. Office Action dated Mar. 18, 2009 cited in U.S. Appl. No. 10/387,287.
U.S. Official Action mailed May 20, 2009 in U.S. Appl. No. 11/599,598.
U.S. Official Action mailed Jun. 11, 2009 in U.S. Appl. No. 11/599,626.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutoria15/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
"The STYLE Element & CSS Selectors", http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
"ID & Class Selectors, Pseudoclasses", http://www.webreference.com/html/tutorial5/7.html, Aug. 20, 1998, 3 pgs.
"ID & Class Selectors, Pseudoclasses", http://www.webreference.com/html/tutorial5/8.html, Aug. 20, 1998, 2 pgs.
"External Style Sheets," http://www.webreference.com/html/tutorial5/10.html, Aug. 20, 1998, 3 pgs.
Raman, "Cascaded Speech Style Sheets," 1997, 7 pgs.
Hopkins, "The Design and Implementation of Pie Menu", Originally published in Dr. Dobb's Journal, 1991, pp. 1-7.
U.S. Office Action dated Jun. 18, 2007 cited in U.S. Appl. No. 10/954,954.
U.S. Office Action dated Mar. 18, 2008 cited in U.S. Appl. No. 10/954,954.
U.S. Office Action dated Oct. 28, 2008 cited in U.S. Appl. No. 10/954,954.
U.S. Office Action dated May 21, 2009 cited in U.S. Appl. No. 11/326,583.
U.S. Office Action dated Jun. 15, 2009 cited in U.S. Appl. No. 10/420,621.
Mexican Official Action dated Feb. 20, 2009 cited in Application No. PA/a/2005/007147—English Translation Only.
European Examination Report dated Mar. 25, 2009 cited in U.S. Appl. No. 07717882.0-1527/1977340.
European Examination Report dated Apr. 1, 2009 cited in U.S. Appl. No. 07717837.4-1527/19773339.

Chinese Second Office Action dated Jul. 10, 2009 cited in Application No. 200510088531.1.
Lewis, "Easy Microsoft Office 2003", Sep. 2003, 10 pgs.
Microsoft Press, "Microsoft Windows User Experience", 1999, pp. 51-52.
Long, Jr., et al., "A Prototype User Interface For A Mobile Multimedia Terminal," Department of Electrical Engineering and Computer Sciences, The University of California at Berkeley, Berkeley, CA. http://sigchi.org/chi95/Electronic/documents/intex;/acl_bdy.htm, retrieved Jan. 10, 2006, 4 pgs.
Landay, et al., "NotePals: Sharing and Synchronizing Handwritten Notes with Multimedia Documents," EECS Department, University of California, Berkeley, CA http://www.cs.berkeley.edu/~landay/research/publications/hcscw/HCSCW-NotePals.html, retrieved Jan. 10, 2006, 8 pgs.
Singh, et al., "Collaborative Note Taking Using PDAs" Department of Computer Science, Naval Postgraduate School, Monterey, CA—http://www.fxpal.com/people/denoue/publications/jise_2005.pdf, 2005, pp. 835-848.
Weverka, Microsoft Office OneNote 2003, Step by Step, http://proquest.safaribooksonline.com/0735621098, Microsoft Press, Jul. 13, 2004, pp. 1-64.
Harter et al., A Distributed Location System for the Active Office, IEEE Network, 1994, pp. 62-70.
Chen et al., A Survey of Context-Aware Mobile Computing Research, Dartmouth Computer Science Technical Report, 2000, 16 pgs.
Schilit, A System Architecture for Context-Aware Mobile Computing, Columbia University, 1995, 153 pgs.
Spreitzer et al., Providing Location Information in a Ubiquitous Computing Environment, SIGOPS '93, 1993, pp. 270-283.
Theimer et al., Operating System Issues for PDAs, In Fourth Workshop on Workstation Operating Systems, 1993, 7 pgs.
Want, Active Badges and Personal Interactive Computing Objects, IEEE Transactions on Consumer Electronics, 1992, 11 pages, vol. 38—No. 1.
Schilit et al., The ParcTab Mobile Computing System, IEEE WWOS-IV, 1993, 4 pgs.
Schilit et al., Context-Aware Computing Applications, In Proceedings of the Workshop on Mobile Computing Systems and Applications, Dec. 1994. pp. 85-90.
Schilit et al., Customizing Mobile Applications, Proceedings USENIX Symposium on Mobile and Location Independent Computing, Aug. 1993, 9 pgs.
Spreitzer et al., Architectural Considerations for Scalable, Secure, Mobile Computing with Location Information, In The 14th International Conference on Distributed Computing Systems, Jun. 1994, pp. 29-38.
Spreitzer et al., Scalable, Secure, Mobile Computing with Location Information, Communications of the ACM, Jul. 1993, 1 page, vol. 36—No. 7.
Want et al., The Active Badge Location System, ACM Transactions on Information Systems, Jan. 1992, pp. 91-102, vol. 10—No. 1.
Weiser, Some Computer Science Issues in Ubiquitous Computing, Communications of the ACM, Jul. 1993, pp. 75-84, vol. 36—No. 7.
Billinghurst et al., An Evaluation of Wearable Information Spaces, Proceedings of the Virtual Reality Annual International Symposium, 1998, 8 pgs.
Rhodes, Remembrance Agent: A continuously running automated information retrieval system, The Proceedings of The First International Conference on The Practical Application Of Intelligent Agents and Multi Agent Technology, 1996, pp. 487-495.
Horvitz et al., In Pursuit of Effective Handsfree Decision Support: Coupling Bayesian Inference, Speech Understanding, and User Models, 1995, 8 pgs.
Rhodes, The Wearable Remembrance Agent: A System for Augmented Theory, The Proceedings of the First International Symposium on Wearable Computers, Oct. 1997, pp. 123-128.
Horvitz et al., Attention-Sensitive Alerting in Computing Systems, Microsoft Research, Aug. 1999.
Schilit et al., Disseminating Active Map Information to Mobile Hosts, IEEE Network, 1994, pp. 22-32, vol. 8, No. 5.
Billinghurst et al., Wearable Devices: New Ways to Manage Information, IEEE Computer Society, Jan. 1999, pp. 57-64.
Starner, Wearable Computing and Contextual Awareness, Massachusetts Institute of Technology, Jun. 1999, 248 pgs.
Rhodes, The Wearable Remembrance Agent: A System for Augmented Memory, Personal Technologies Journal Special Issue on Wearable Computing, 1997, 12 pgs.
Workshop on Wearable Computing Systems, Aug. 19-21, 1996, 3 pgs.
Billinghurst, Research Directions in Wearable Computing, University of Washington, May, 1998, 48 pgs.
Weiser, The Computer for the 21st Century, Scientific American, Sep. 1991, 8 pgs.
Joachims, Text categorization with support vector machines: learning with many relevant features, Machine Learning, European Conference on Machine Learning, Apr. 21, 1998, pp. 137-142.
International Search Report dated Sep. 29, 2003 for PCT Application No. 00/20685, 3 pgs.
Losee, Jr., Minimizing information overload: the ranking of electronic messages, Journal of Information Science 15, Elsevier Science Publishers B.V., 1989, pp. 179-189.
U.S. Office Action mailed Dec. 11, 2008 cited in U.S. Appl. No. 11/405,251.
U.S. Office Action mailed Jun. 11, 2009 cited in U.S. Appl. No. 11/405,256.
U.S. Final Office Action mailed Jul. 17, 2009 cited in U.S. Appl. No. 11/405,251.
U.S. Office Action mailed Aug. 7, 2009 cited in U.S. Appl. No. 11/326,110.
PCT Search Report dated Aug. 27, 2007 in PCT/US2007/007233.
PCT Search Report dated Sep. 21, 2007 in PCT/US2007/007231.
U.S. Office Action dated Dec. 23, 2009 cited in U.S. Appl. No. 11/405,251.
Chinese First Office Action dated Dec. 18, 2009 cited in Application No. 200780001911.4.
Chinese First Office Action dated Jan. 22, 2010 cited in Application No. 200780013627.9.
Mexican Official Action dated Oct. 26, 2009 cited in Application No. PA/a/2005/007147.
Boyce, "Microsoft Outlook Version 2002 Inside Out," 2001, pg. 14.
U.S. Final Office Action dated Feb. 4, 2010 cited in U.S. Appl. No. 11/405,256.
U.S. Office Action dated Oct. 19, 2009 cited in U.S. Appl. No. 11/599,598.
Russian Office Action dated Jun. 15, 2009 cited in Application No. 2005120371/09(023031).
European Examination dated Oct. 6, 2009 cited in Application No. 07 717 882.0-1527.
European Examination dated Oct. 6, 2009 cited in Application No. 07 717 837.4-1527.
Chinese First Office Action dated Oct. 30, 2009 cited in Chinese Application No. 200780001988.1.
Kamel et al, "Retrieving Electronic Ink by Content," Multimedia Database Management Systems, 1996, Proceedings of International Workshop on Aug. 14-16, 1996, pp. 54-61.
Chinese First Office Action dated Mar. 10, 2010 cited in Application No. 200780013630.0 (14917.0380CCWO).
Australian Examiner's First Action dated Apr. 30, 2010 cited in Application No. 2005202719.
U.S. Office Action dated Jun. 23, 2010 cited in U.S. Appl. No. 11/405,256 (14917.0380us01).

* cited by examiner

METHOD AND SYSTEM FOR IMPROVED ELECTRONIC TASK FLAGGING AND MANAGEMENT

FIELD OF THE INVENTION

The present invention generally relates to calendar, scheduling and time management systems. More particularly, the present invention relates to a method and system for improved electronic task management.

BACKGROUND OF THE INVENTION

With the advent of the computer age, computer and software users have grown accustomed to user-friendly software applications that help them write, calculate, organize, prepare presentations, send and receive electronic mail, make music, and the like. For example, electronic mail systems allow users to send, receive, respond to and store a variety of mail messages and related information. Electronic calendar systems allow users to store, organize and view meeting dates, appointments and tasks. Electronic task management applications allow users to store, organize and view a variety of tasks that a use must complete or that a user desires to complete according to various time schedules.

However, even with the available functionality of such systems, many users of modern electronic calendar and task management applications still resort to paper task or "to-do" lists on which they write tasks they need to perform or upcoming events, such as appointments or meetings. One reason users resort to such manual systems is because of a real or perceived difficulty associated with inputting tasks and related information into an electronic task management application. For example, typical electronic task management applications require users to launch a task input user interface followed by input of information associated with a task or upcoming event.

Accordingly, there is a need for an improved task input and management method and system that allows users to easily create tasks and input information associated with created tasks. It is with respect to these and other considerations that the present invention has been made.

SUMMARY OF THE INVENTION

Embodiments of the present invention solve the above and other problems by providing an improved method and system for identifying data items as task items and for inputting information associated such task items according to an electronic task management application or system. Generally described, according to aspects of the invention, any data item may be annotated (flagged) with information that causes the data item to be recognized as a task item by applications that aggregate, display or otherwise use task and task-like items. Upon flagging an individual data item, the flagged data item is then populated into and exposed by one or more applications used for displaying tasks such as a tasks application, calendar application, or electronic to-do list application.

According to aspects of the invention, a quick flag box is displayed adjacent to every electronic correspondence item that may be flagged as a task. Upon selection of the quick flag box for any electronic correspondence item, a property is set for the item that causes the item to be populated into and displayed by applications that display tasks, such as calendar applications, tasks applications, or electronic to-do lists applications. According to other aspects, additional properties may be applied to a flagged item including start dates and task categories. Additional properties may be applied to a flagged item from a launched menu of task properties that is contextually related to the selected flagged item. In addition, properties may be applied to individual task items from top-level actions menus and mail inspector applications.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved task input and management method and system that allows users to easily mark data items as tasks and input information associated with marked data items. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
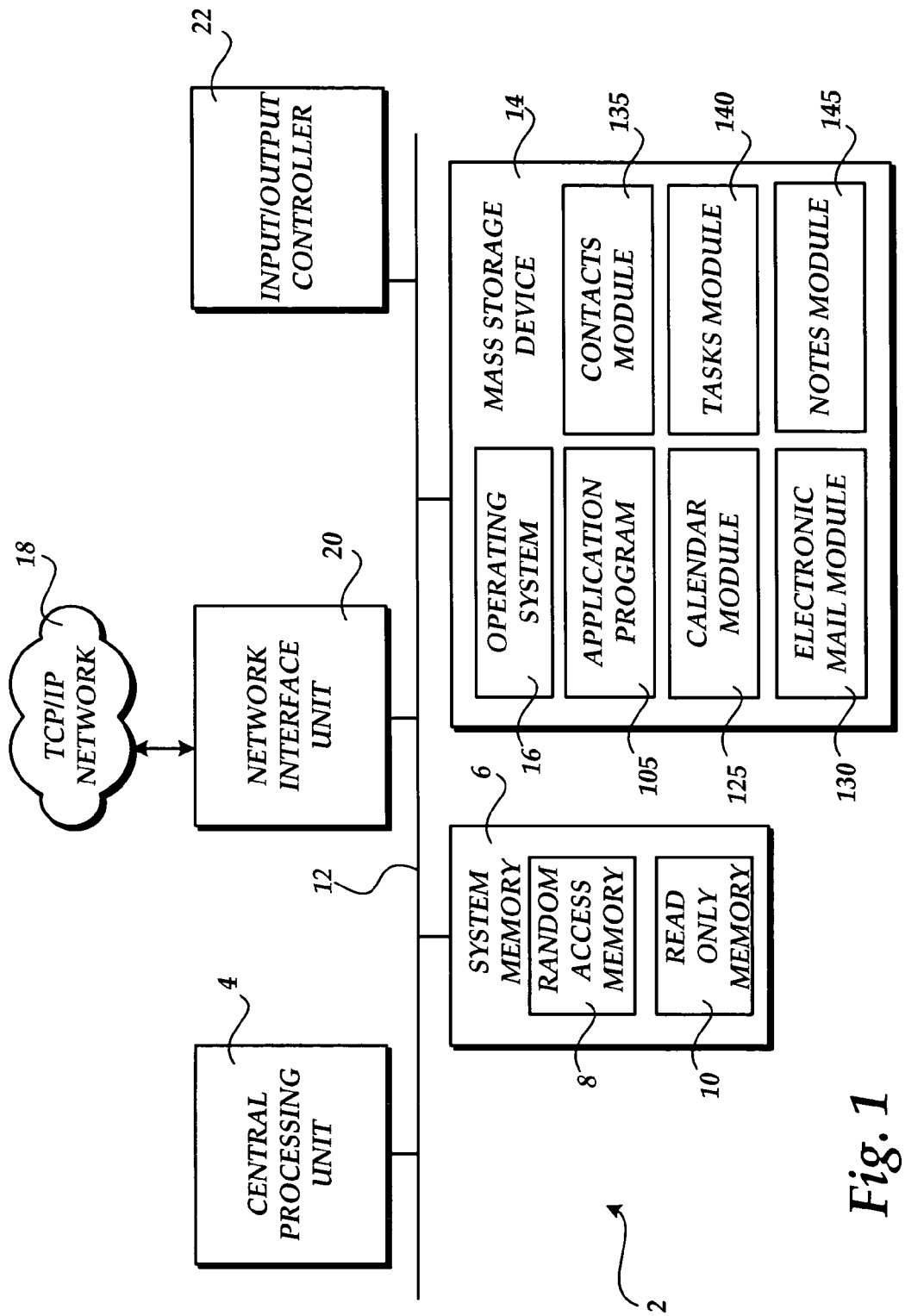
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application 105 for providing a variety of functionalities to a user. For instance, the application 105 may comprise many types of programs such as a word processing application program, a spreadsheet application, a desktop publishing, and the like. According to an embodiment of the present invention, the application 105 comprises a multiple functionality software application for providing a user calendar functionality, electronic tasks functionality, electronic mail functionality, contacts information functionality, electronic notes functionality, electronic journal functionality and the like. Some of the individual program modules comprising the multiple functionality application 105 include a calendar application 125, an electronic mail application 130, a contacts application 135, a tasks application 140, a notes application 145 and a journal application (not shown). An example of such a multiple functionality application 105 is OUTLOOK® manufactured by Microsoft Corporation.

Figure 2:
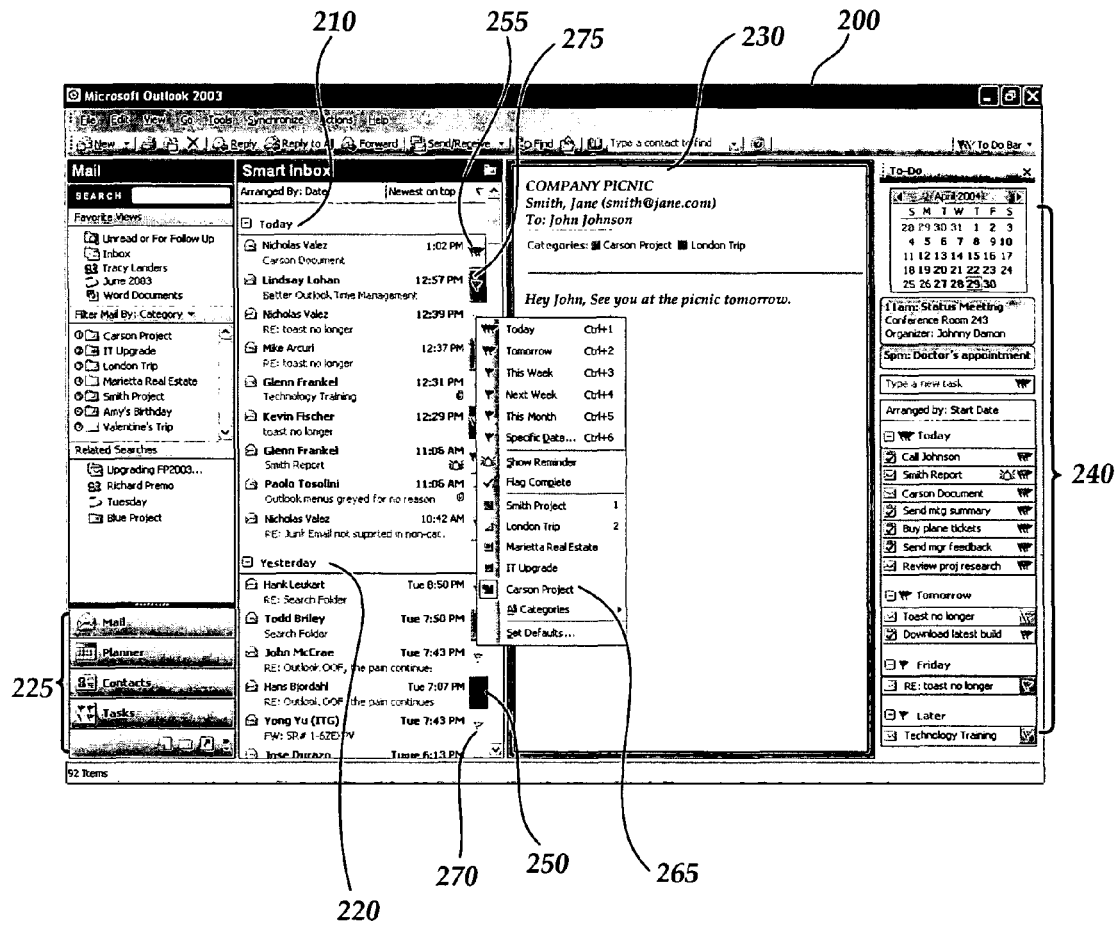
FIG. 2 is illustrates a computer screen display showing an electronic mail application user interface according to embodiments of the present invention.

FIG. 2 illustrates a computer screen display of an electronic mail application user interface according to embodiments of the present invention. The user interface 200 is illustrative of an electronic mail application 130 user interface for displaying electronic data items received, sent or stored in a variety of storage folders. An example electronic mail application user interface illustrated in FIG. 2 is provided by OUTLOOK® manufactured and marketed by Microsoft Corporation of Redmond, Wash.

The user interface 200 illustrated in FIG. 2 includes an inbox 210 with which the user may view a listing of electronic data items that have been received by the user, that have been sent by the user, or which have been stored in one or more user-established storage folders. As illustrated in FIG. 2, a number of electronic data items are listed in the inbox pane 210. To the right of the inbox 210, a view or preview pane 230 is illustrated for displaying the contents of a selected data item. As is appreciated by those skilled in the art, if the user has activated a preview, the user may receive a preview of the contents of a selected data item by focusing on the data item in the inbox 210.

Along the lower left-hand corner of the user interface 200 is an application selection pane 225 containing selectable functionality controls for selecting other types of functionality provided by the multiple functionality software application 105 (described above) through which the user's electronic mail application is provided. For example, the display of the electronic mail user interface 200 is in response to selection of the "Mail" control. If the user wishes to launch a user interface associated with a tasks application 140, the user may select the "Tasks" control to launch the functionality of the tasks application 140 including presentation of a user interface 200 associated with the tasks application. Likewise, the user may select the "Contacts" control to launch the functionality of a contacts application 135 and an associated user interface 200 for displaying information and functionality for a contacts application 135.

Referring still to FIG. 2, a To Do bar 240 is illustrated. According to embodiments of the invention, functionality of the To-Do bar 240 is provided by the multiple functionality application 105. As described below, according to one displayed embodiment of the present invention, the To-Do bar 240 includes a date picker control, an appointments/meetings view, a task input panel, and a task list. According to embodiments of the present invention, the To-Do bar 240 is always displayed in the user interface 200 so that a user has a quick and easy view of upcoming meetings, appointments and tasks without the need to launch specific applications, for example, calendar applications and tasks applications, for obtaining that information. For a detailed description of the To-Do bar 240, see U.S. patent application having Ser. No. 10/955,928, entitled "Improved User Interface For Providing Task Management and Calendar Information," which is incorporated herein by reference as if fully set out herein.

Referring still to FIG. 2, according to embodiments of the present invention, data items may be marked for recognition by other applications as tasks or task-like items. Marking such data items for recognition as task items may include flagging the data items with task properties such as task start dates and/or task categories. Any number of data items may be marked for recognition as task items, such as electronic correspondence items, including electronic mail items, meeting requests, meeting responses, task requests and task responses. Other data items that may be marked for recognition as task items include text selections, spreadsheet data, contacts information and the like. For purposes of example, operation of embodiments of the present invention is described herein in the context of marking or flagging electronic data items for recognition as task items. But, as should be appreciated, the functionality of the present invention is equally applicable to other data items as set forth above.

A pop-up context menu 265 is illustrated for applying one or more properties, for example, task start dates and task categories, to a selected data item so that the flagged data item becomes a task item bearing the applied properties. Once a data item is flagged as a task, according to embodiments of the present invention, the properties applied to the data item, for example, start date and task category, will dictate the position of the corresponding task item in a task list provided by a tasks application 140 or provided by a task list contained in a To-Do bar 240. For example, if a given data item is flagged with a start date property of "today" and a category of "work project," a corresponding task may be displayed in a user's task list along with other tasks having a start date of "today," and the task will bear a category icon indicating that the task is associated with the "work project" category. Thus, the user is able to automatically mark a data item as a task without the need for launching a user interface, completing a task entry form, and submitting the form to a tasks application 140 for creation and storage of the desired task item.

Individual data items are flagged as tasks using a task flagging control (hereinafter referred to as a "quick flag box") that is displayed to the right of every data item that may be flagged according to embodiments of the present invention. Referring still to FIG. 2, the quick flag box is comprised of two components. The flag icon 255 represents whether an item has been flagged as a task. If an item has a flag icon showing in the quick flag box, the item has been flagged as a task and will appear in any user interface that displays tasks such as is provided by the tasks application 140, and as is displayed in the To-Do bar 240. According to embodiments of the present invention, a triple-flag icon indicates a start date that matches or precedes the current date. Or, the triple-flag icon may be used to indicate a start date of today. Referring to FIG. 2, a triple-flag icon 255 is illustrated next to a data item in the inbox 210. A double-flag icon, as illustrated in the context menu 265, indicates tasks having a start date matching a next work-day, or a task item having a start date within the current week other than today. A single-flag icon 275 indicates tasks having a start date past the current week. According to one embodiment of the present invention, the flag icon for a given task changes at midnight, as necessary. That is, if a task item bears a double-flag icon indicating a start date of "Tomorrow," at midnight, the flag icon will be changed to a triple-flag icon indicating that the task has a start date of "Today." As should be appreciated, the flagging icons described above are by way of example. A number of different icons may be used to indicate different task start dates or due dates.

A second property that may be applied to a created task is a category for the created task. A number of task categories that are system-defined or user-defined may be applied to individual tasks. For example, a user may define a first task category associated with a given work project. A second task category may be assigned to a second given work project. A third task category may be assigned to a personal project. A fourth task category may be assigned to a vacation project, and so on. As should be appreciated, the example task categories described herein are not limiting of the great variety of task categories that may be designed by a user or that may be system designed. According to embodiments of the present invention, a task color is assigned to each task category to distinguish one category from another. Accordingly, in addition to applying a timing property to a selected data item, a category property may also be applied to the selected data item to categorize the corresponding task item.

As illustrated in FIG. 2, a variety of task flagging combinations may be applied to a given data item. For example, the flag icon 255 has been applied to an associated data item in the inbox 210, but no category color has been applied to the quick flag box containing the flag icon 255. Thus, the corresponding task item has a selected start date associated with the flag icon 255, but the task item has not been categorized by the user. The quick flag box 275 illustrates the application of a single flag icon indicating a start date past the current week, and the quick flag box has been colored light green to indicate a particular task category. For example, as shown in the context menu 265, the light green coloring is associated with a task category of "IT upgrade." Referring to the bottom portion of the inbox 210, the quick flag box 250 is illustrated that has been colored blue according to an associated task category. However, the quick flag box 250 does not include a flag icon indicating that no start date or due date has been set for the corresponding task item. Beneath the quick flag box 250 is a quick flag box 270 that has not been selected for creation of a task. That is, the quick flag box 270 has not been colored according to a given task category, and no flag icon has been applied to the corresponding data item. Thus, no task has been created for the corresponding data item.

According to an embodiment of the present invention, a tool-tip box may be provided that may deploy when a user hovers a mouse cursor over a given quick flag box 250, 270, 275. The tool-tip box may provide information to a user as to how to utilize the quick flag box. For example, a tool tip may instruct a user to right-click on a given quick flag box to launch a context menu 265 for applying one or more task flagging properties to a task created from the associated data item. According to an embodiment of the present invention, if a given data item bears other informational icons, for example reminder icons, a corresponding task item will also bear the additional informational icons.

As briefly described above, according to embodiments of the present invention, any items that appear in a mail folder of an electronic mail application 130 may be flagged for creation of a task. Such data items include electronic mail messages, meeting requests, meeting responses, task requests, and task responses. Flagging a data item for creation of a task causes the multiple functionality application 105 or the individual electronic mail application 130 to set special properties on the flagged data item. Setting properties on the flagged data item will cause a data item to appear in a tasks application 140 user interface for showing task items or in the To-Do bar 240 illustrated in FIG. 2. Additionally, flagged data items may appear in a calendar user interface provided by a calendar application 125 via a search folder. Properties set on a selected data item include a task subject to allow the task item to have a title without requiring changes to the subject line of the corresponding data item. A due date and time, a start date, a date completed and any selected menu items applied to the flagged item are properties applied to a data item according to embodiments of the present invention. Properties may be set on data items for ordering corresponding task items relative to other displayed task items. According to embodiments of the present invention, when a user flags a task request contained in a mail folder, properties of an embedded task contained in the task request are not affected by properties set for the associated data item for creating a task.

Having described the task flagging functionality according to embodiments of the present invention with respect to FIG. 2 above, FIGS. 3 through 7 and the associated description below, describe methods for applying a flag to an individual data item to create a corresponding task item for use and display by a calendar application 125, a tasks application 140, or for inclusion in a task list in a To-Do bar 240. As briefly described above, data items may be flagged as new tasks by selecting the quick flag boxes associated with displayed data items and by applying task flagging properties through a context menu 265, a radial menu (not shown), a mail inspector application, or from a top-level actions menu.

Referring back to FIG. 2, when a user performs a single selection action, such as a primary left mouse click, on a quick flag box 250, 270, 275 associated with a given data item, the item will automatically be identified or marked as a corresponding task item that is scheduled with a default start date of today. The item then appears below the current day on a calendar application user interface and in the "Today" group of a task list such as the task list illustrated in the To-Do bar 240, or in a task list provided by the tasks application 140. By default, selecting the item's quick flag box does not assign any task category to the item. However, if desired, a default task category may be set, as described below, which will be automatically applied to a flagged data item for the corresponding task item.

Figure 3:
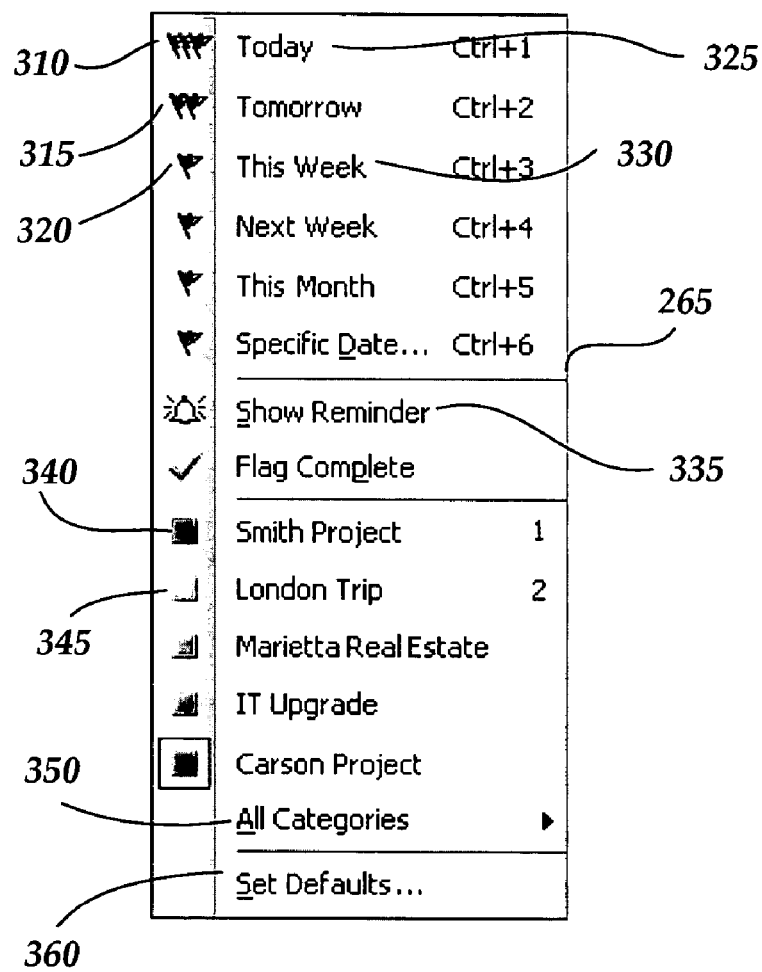
FIG. 3 illustrates a computer screen display showing a context menu for applying one or more properties to individual data items so that other applications will recognize the data items as task items according to embodiments of the present invention.
Figure 4:
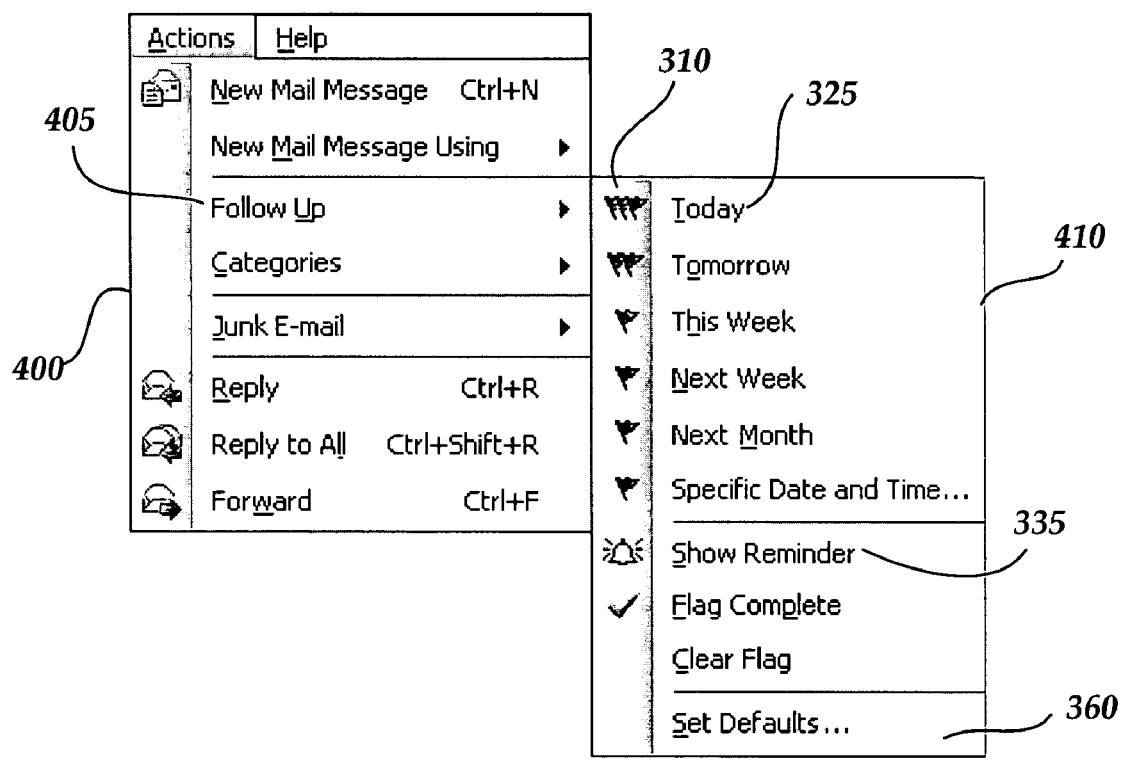
FIG. 4 illustrates a context menu for applying one or more properties to individual data items so that other applications will recognize the data items as task items according to embodiments of the present invention.

Referring to FIGS. 2 and 3, when a user performs a secondary selection action, for example, a right mouse click, on the quick flag box 250, 270, 275 for a given data item, the context menu 265 is deployed. As described below, the context menu 265 may also be deployed from the top-level actions menu selectable from a top-level tool bar associated with the given software application 125, 130, 140. Once the context menu 265 is deployed, a user may select specific timing properties (e.g., start date, due date, etc.), task category properties, and other properties including reminder properties and task complete properties. As set forth above, basic selection of a given data item for marking a corresponding task item sets a default start date of today and sets no category for the created task.

With the context menu 265, a user may customize start date or due date properties and category properties for the created task. For example, if a user desires a start date of this week, the user may select the "This Week" control 330 from the context menu 265 to apply the associated start date property to the new task. Selection of the "This Week" control 330 also populates the quick flag box with an associated single flag icon 320 as illustrated for the quick flag box 275.

If the user desires to assign a particular task category to the created task item, the user may select one of the category controls, for example, the "Smith Project" control 340, the "London Trip" control 345, or the "IT Upgrade" category. The bottom portion of the context menu 265 shows the top five most frequently used category names in order of frequency of use with the associated color controls 340, 345. In addition, a user may assign multiple categories to a selected item. For example, the category "Carson project" illustrated in the context menu 265 is associated with multiple categories, and accordingly, the color applied to the quick flag box upon application of the "Carson project" category is comprised of multiple colors associated with the multiple categories assigned to the associated data item and new task item. As should be understood, the example task categories illustrated in the context menu 265 are for purposes of example only and are not restrictive of the many different task categories that may be system-defined or that may be defined by an individual user. In order to review additional task categories, the "All Categories" control 350 may be selected to cause a fly-out menu to be displayed showing all additional task categories that may be applied to a given task item.

Additional properties that may be applied to a task item include the "Show Reminder" property 335 and a "Flag Complete" property. Additionally, as set forth above, a "Set Defaults" control 360 is provided in the context menu 265 to set certain default properties that will be applied to a task item automatically upon selection of the quick flag box associated with a given data item. For example, a default task category may be set which will then be automatically applied upon initial selection of a quick flag box for creation of a task item. However, a user may always change the default task category to a different task category by selection of a desired task category from the context menu 265. Similarly, a default start date or due date property may be selected for all created task items, but may be modified if desired. A "Clear Flag" property may also be set on a data item to clear the data item of previously set task properties such that the data item will no longer be recognized as a task item.

For application of two properties to a selected data item and corresponding task item with a single user action (e.g., mouse click), a radial context menu may be provided to allow the user to select a desired start date or due date and task category simultaneously by selecting a given location in the radial context menu. For a detailed description of a radial context menu for use in accordance with embodiments of the present invention, see U.S. patent application, entitled "Two-dimensional Radial User Interface For Computer Software Applications," which is incorporated herein by reference as if fully set out herein.

In addition to the foregoing, properties may also be applied to a selected data item and corresponding new task item by selecting a top-level actions menu associated with the software application user interface in use by the user. For example, the user interface 200 illustrated in FIG. 2 is a user interface associated with an electronic mail application 130. According to embodiments of the present invention, upon selection of a given data item for flagging the data item as a new task, the user may select a top level actions control to deploy an actions menu 400 illustrated in FIG. 4. The user may then deploy one or more fly-out menus 410 for applying particular properties to the selected new task item. For example, selection of the "Follow-Up" control 405 causes deployment of the fly-out menu 410 with which the user may apply a start date property to the selected item. For example, a start date property of "Today" and a corresponding triple flag icon 310 may be applied to a selected data item for application to the corresponding new task item. Additional controls, such as the "Show Reminder" control 335 may be selected for applying other properties to the selected item. As described above for the context menu 265, a "Set Defaults" control 360 is provided for setting certain default properties to any selected item. According to one embodiment, the properties contained in the fly-out menu 410 of the actions menu 400 comprise a subset of the properties available in the context menu 265, illustrated and described above. In order to apply a task category to the selected data item, the "Categories" control may be selected to deploy a different fly-out menu 410 containing category selection controls. As described above for the context menu 265, selection of a given category control from the fly-out menu 410 causes the selected category property to be applied to the data item and corresponding new task item.

Figure 5:
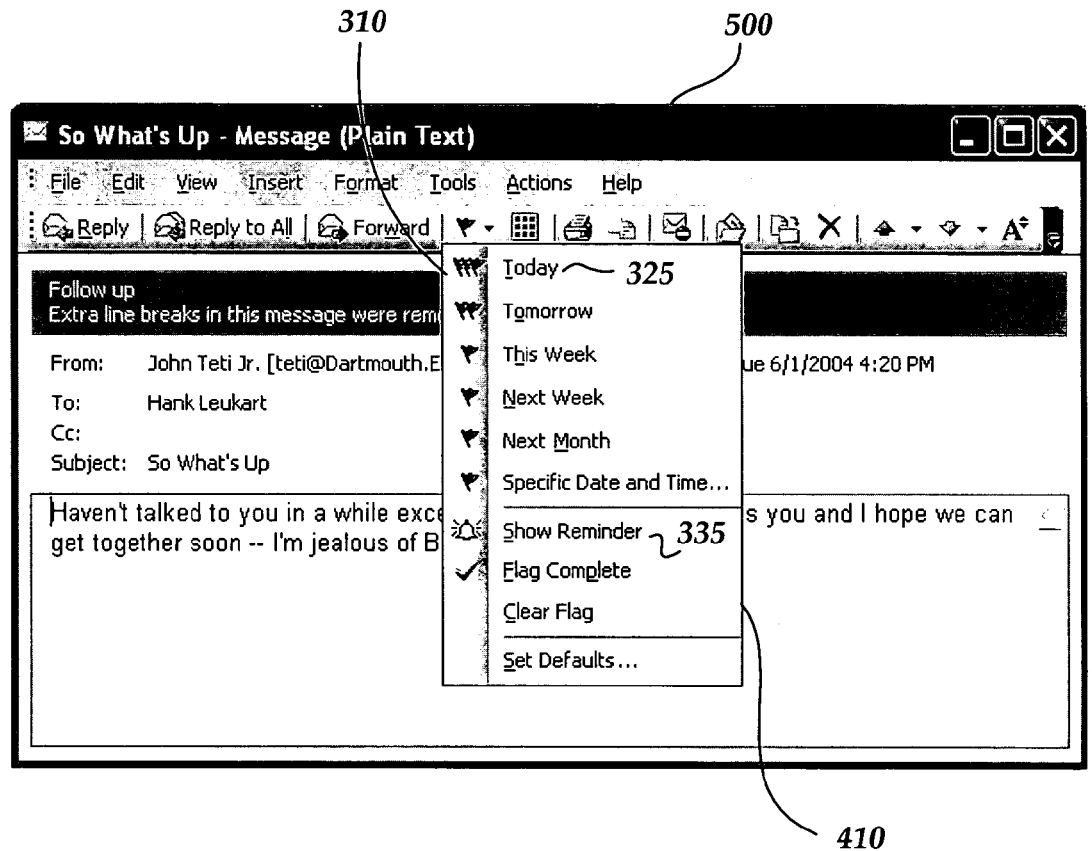
FIG. 5 illustrates a computer screen display showing an electronic mail viewer user interface and an associated context menu for applying one or more properties to one or more data items so that other applications will recognize the data items as task items according to embodiments of the present invention.

Referring to FIG. 5, a mail inspector application user interface 500 is illustrated. If an electronic data item contained in the mail inspector application is flagged for follow-up, the flagged data item automatically creates a task item, as described herein. In order to apply particular properties to the flagged data item, a drop-down menu 410 is deployed from which the user may select one or more properties for application to the flagged data item and corresponding task item. For example, as illustrated in FIG. 5, selection of the flag icon in the tool bar of the user interface 500 causes a deployment of the menu 410 from which the user may select start date properties and other timing and default properties, as described above for FIG. 4.

Referring still to FIG. 5, a task category may be applied to the flagged data item and corresponding task item by selecting the category icon from the tool bar illustrated in the user interface 500. In response, a menu 410 will be deployed similar to the menu 410 illustrated in FIG. 5, but containing one or more system-defined or user-defined task categories. Selection of one of the available task categories causes application of the selected task category property to the selected data item and corresponding new task item.

According to an embodiment of the invention, a given data item may also be flagged as a new task item by dragging the data item to the task list or date picker control contained in the To-Do bar 240, illustrated in FIG. 2. For example, if a given data item is dragged from the inbox 210 to the "Today" section of the task list in the To-Do bar 240, the user action will cause the creation of a new task item in the "Today" section of the task list 240. If the user desires to add a category property to the task list, the user may select the created task item and deploy the context menu 265 for application of a desired category. In addition, an electronic data item may be dragged to a particular date in the date picker control at the top of the To-Do bar 240 to cause the data item to be flagged as a task item with a start date associated with the date in the date picker control on which the data item is dropped. Again, if the user desires to add additional properties to the created task item, the user may launch a context menu 265 for application of additional properties.

According to embodiments of the present invention, a user may re-flag an item previously flagged as a task item. If the user applies a flag to an item and then flags the item again, all relevant properties, for example, start date and task category, are reset according to the second flagging of the item unless the user has selected a "Specific Date And Time" option. If the user has selected a "Specific Date And Time" option, then re-flagging a previously flagged item only changes the start date of the flagged item according to the date on which the item is re-flagged.

Figure 6:
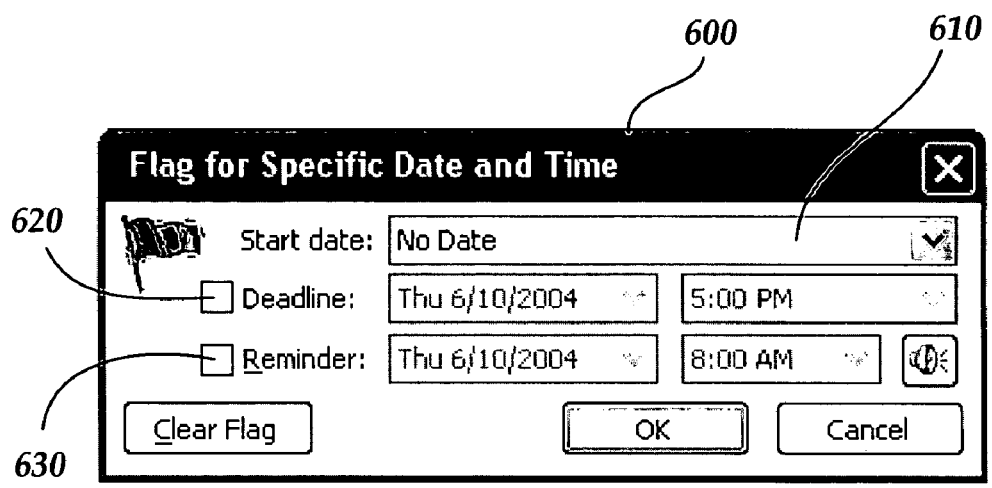
FIG. 6 illustrates a computer screen display for setting a specific date and time for a data item marked as a task according to embodiments of the present invention.

Referring to FIG. 6, if the user selects a "Specific Date And Time" option from the context menu 265, a dialog box 600 may be displayed. With the dialog box 600, the user may complete the date field 610 to set a specific start date for a task. By default, the start date field 610 will show the start date that is presently set for the item. If the item has no start date, the field will show "No Date." The deadline box 620 is unchecked by default. If desired, a due date may be set for the task by clicking the deadline box and populating the deadline fields with a specific deadline date. In addition, a specific deadline time may also be selected for a given task item. The reminder box 630 is unchecked by default. The reminder control allows a user to set a date and time when the user wishes a reminder to be made to the user regarding the associated task item. A "Clear Flag" button is provided to allow all previously set flag properties to be cleared as described above.

Figure 7:
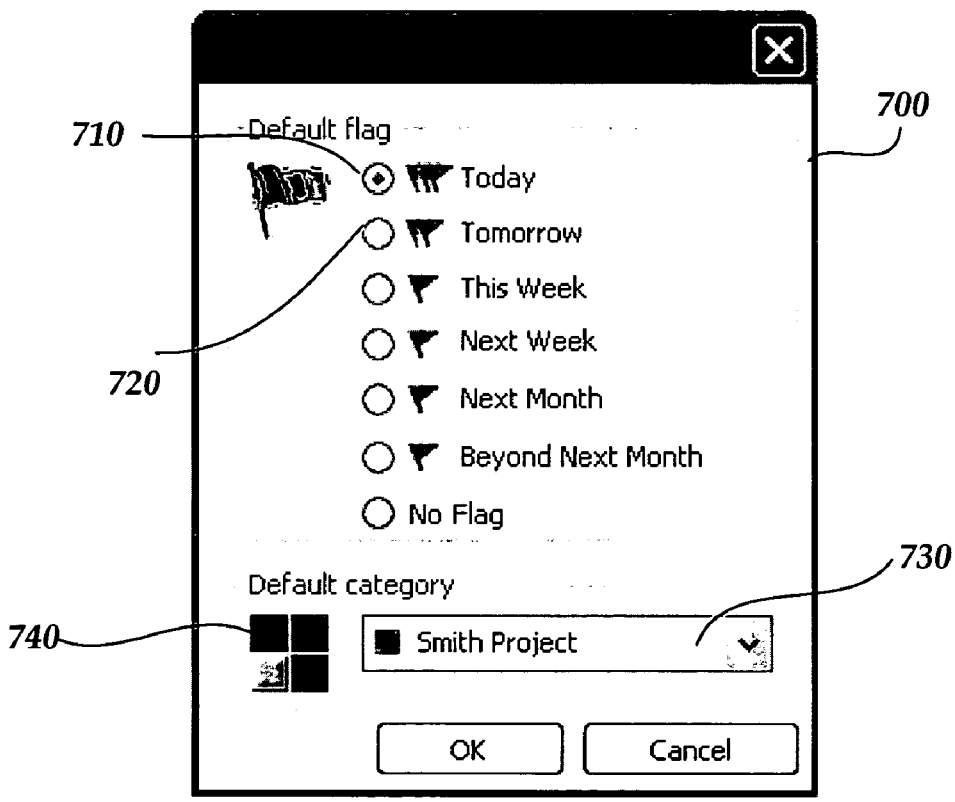
FIG. 7 illustrates a computer screen display of a menu for setting default behavior associated with data items marked as task items according to embodiments of the present invention.

As described above, with reference to FIG. 3, default task item start dates and default task item categories may be set by a user for automatic application to all selected data items. For example, if a user desires to automatically apply a start date of "Tomorrow" and a category of "Work Project" to all selected data items by default, the user may establish such a default setting by selecting the "Set Defaults" control 360 from the context menu 265. In response to selecting the "Set Defaults" control, a dialog box or menu 700, illustrated in FIG. 7, is displayed to allow the setting of default behavior applied to selected data items. As illustrated in FIG. 7, a default flag, such as the "Today" flag 710 or the "Tomorrow" flag 720 may be selected. If the "No Flag" control is selected, then no start date flag is applied to the associated task item, but a default category may nonetheless be selected for application to selected data items and associated task items. In the bottom portion of the dialog box 700, a default category may be selected. Selection of the combination box 730 provides a listing of all available categories for application to selected items as default categories.

As described herein, methods and systems provide for automatically marking data items as for recognition as task items by selection of a quick flag box associated with individual data items. By applying one or more task properties to individual data items according to embodiments of the present invention, a user is able to create a task item by "touching" on a selected data item. Thus, the user avoids the potentially cumbersome and time-consuming process of launching a task item creation user interface to complete information associated with a desired task item. Through the use of quickly and efficiently deployed context menus associated with selected data items, a user may apply important information such as start times and task categories to selected data items and corresponding task item. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for marking a data item for recognition as a task item, the method comprising:

associating a task flagging control with the data item, wherein the task flagging control comprises a context menu displaying selection options comprising assigning a task timing property to the data item;

receiving a selection of the task flagging control, wherein receiving the selection of the task flagging control comprises receiving the selection from the context menu accessed via a quick flag box adjacent to the data item;

in response to receiving the selection of the task flagging control, automatically applying at least one property to the data item such that the data item is recognized as a task item corresponding to a task to be completed by a user;

automatically applying a default start date property, a default task category, and a default due date to the data item; and automatically updating the timing property at a predetermined time, wherein automatically updating the timing property comprises at least one of the following:

indicating, by displaying a first icon adjacent to the task item, whether the timing property precedes a current date, indicating, by displaying the first icon adjacent to the task item, whether the timing property matches the current date, indicating, by displaying a second icon adjacent to the task item, whether the timing property matches a next date, indicating, by displaying the second icon adjacent to the task item, whether the timing property matches a date in a current week other than the current date, and indicating, by displaying a third icon adjacent to the task item, whether the timing property proceeds the current week.

2. The method of claim 1, further comprising storing the task item in a list of task items.

3. The method of claim 2, further comprising displaying the list of task items in a task list user interface.

4. The method of claim 1, wherein automatically applying the at least one property to the data item such that the data item is recognized as the task item includes applying a start date property to the data item.

5. The method of claim 4, wherein applying the start date property to the task item includes applying the start date property from the context menu containing at least one start date property.

6. The method of claim 4, further comprising populating the task flagging control with a visual icon for identifying the start date property applied to the task item.

7. The method of claim 1, wherein automatically applying the at least one property to the data item such that the data item is recognized as the task item includes applying a task category property to the data item.

8. The method of claim 7, wherein applying the task category property to the data item includes applying the task category property from the context menu containing at least one task category property.

9. The method of claim 7, further comprising populating the task flagging control with a visual identifier for identifying the task category property applied to the data item.

10. The method of claim 9, wherein populating the task flagging control with the visual identifier for identifying the task category property applied to the data item includes populating the task flagging control with a unique color associated with the task category property applied to the task item.

11. A computer storage medium containing computer-executable instructions which when executed by a computer perform a method for marking a data item for recognition as a task item, the method executed by the computer-executable instructions comprising:

associating a task flagging control with the data item, wherein the task flagging control comprises a context menu displaying selection options comprising assigning a task timing property to the data item, wherein assigning the task timing property comprises automatically marking the data item and completing a task entry form;

receiving a selection of the task flagging control, wherein receiving the selection of the task flagging control comprises receiving the selection from the context menu accessed via a quick flag box adjacent to the data item;

in response to receiving the selection of the task flagging control, automatically applying at least one property to the data item such that the data item is recognized as a task item corresponding to a task to be completed by a user;

automatically applying a default start date property, a default task category, and a default due date to the data item; and automatically updating the timing property at a predetermined time, wherein automatically updating the timing property comprises at least one of the following:

indicating, by displaying a first icon adjacent to the task item, whether the timing property precedes a current date, indicating, by displaying the first icon adjacent to the task item, whether the timing property matches the current date, indicating, by displaying a second icon adjacent to the task item, whether the timing property matches a next date, indicating, by displaying the second icon adjacent to the task item, whether the timing property matches a date in a current week other than the current date, and indicating, by displaying a third icon adjacent to the task item, whether the timing property proceeds the current week.

12. The computer storage medium of claim 11, further comprising storing the task item in a list of task items.

13. The computer storage medium of claim 12, further comprising displaying the list of task items in a task list user interface.

14. The computer storage medium of claim 11, wherein automatically applying the at least one property to the data item such that the data item is recognized as the task item includes applying a start date property to the data item.

15. The computer storage medium of claim 14, wherein applying the start date property to the data item includes applying the start date property from the context menu containing at least one start date property.

16. The computer storage medium of claim 14, further comprising populating the task flagging control with a visual icon for identifying the start date property applied to the task item.

17. The computer storage medium of claim 11, wherein automatically applying the at least one property to the data item such that the data item is recognized as the task item includes applying a task category property to the data item.

18. The computer storage medium of claim 17, wherein applying the task category property to the data item includes applying the task category property from the context menu containing at least one task category property.

19. The computer storage medium of claim 18, further comprising populating the task flagging control with a visual identifier for identifying the task category property applied to the data item.

20. The computer storage medium of claim 18, wherein applying the task category property from the context menu containing the at least one task category property includes populating the task flagging control with a unique color associated with the task category property applied to the data item.

21. A method for marking a data item for recognition as a task item, the method comprising:
  associating a task flagging control with the data item displayed in a user interface, wherein the task flagging control comprises a context menu displaying selection options comprising assigning a task timing property to the data item;
  receiving a selection of the task flagging control, wherein receiving the selection of the task flagging control comprises receiving the selection from the context menu accessed via a quick flag box adjacent to the data item;
  in response to receiving the selection of the task flagging control, automatically applying at least one property to the data item such that the data item is recognized as a task item corresponding to a task to be completed by a user;
  automatically applying a default start date property, a default task category, and a default due date to the data item;
  in response to receiving a second selection of the task flagging control, receiving a selection of at least one task property for application to the data item;
  applying a visual identifier to the task flagging control for indicating an application of the at least one task property to the data item; and
  automatically updating the timing property at a predetermined time, wherein automatically updating the timing property comprises at least one of the following:
    indicating, by displaying a first icon adjacent to the task item, whether the timing property precedes a current date,
    indicating, by displaying the first icon adjacent to the task item, whether the timing property matches the current date,
    indicating, by displaying a second icon adjacent to the task item, whether the timing property matches a next date,
    indicating, by displaying the second icon adjacent to the task item, whether the timing property matches a date in a current week other than the current date, and
    indicating, by displaying a third icon adjacent to the task item, whether the timing property proceeds the current week.

22. The method of claim 21, further comprising storing the task item in a list of task items.

23. The method of claim 22, further comprising displaying the list of task items in a task list user interface.

24. The method of claim 21, wherein receiving the selection of the task flagging control includes receiving a start date property for application to the data item.

25. The method of claim 24, wherein receiving the start date property for application to the data item includes receiving the start date property from the context menu containing at least one start date property.

26. The method of claim 24, further comprising populating the task flagging control with a visual icon for identifying the start date property applied to the data item.

27. The method of claim 21, wherein receiving the selection of the task flagging control includes receiving a task category property for application to the data item.

28. The method of claim 27, wherein receiving the task category property for application to the data item includes receiving the task category property from the context menu containing at least one task category property.

29. A computer storage medium containing computer-executable instructions which when executed by a computer perform a method for marking a data item for recognition as a task item, the method executed by the computer-executable instructions comprising:
  associating a task flagging control with the data item displayed in a user interface, wherein the task flagging control comprises a context menu displaying selection options comprising assigning a task timing property to the data item;
  receiving a selection of the task flagging control, wherein receiving the selection of the task flagging control comprises receiving the selection from the context menu accessed via a quick flag box adjacent to the data item;
  in response to receiving a first selection of the task flagging control, automatically applying at least one property to the data item such that the data item is recognized as a task item corresponding to a task to be completed by a user;
  automatically applying a default start date property, a default task category, and a default due date to the data item;
  in response to receiving a second selection of the task flagging control, receiving a selection of at least one task property for application to the data item;
  applying a visual identifier to the task flagging control for indicating an application of the at least one task property to the data item; and
  automatically updating the timing property at a predetermined time, wherein automatically updating the timing property comprises at least one of the following:
    indicating, by displaying a first icon adjacent to the task item, whether the timing property precedes a current date,
    indicating, by displaying the first icon adjacent to the task item, whether the timing property matches the current date,
    indicating, by displaying a second icon adjacent to the task item, whether the timing property matches a next date,
    indicating, by displaying the second icon adjacent to the task item, whether the timing property matches a date in a current week other than the current date, and
    indicating, by displaying a third icon adjacent to the task item, whether the timing property proceeds the current week.

30. The computer storage medium of claim 29, further comprising storing the task item in a list of task items.

31. The computer storage medium of claim 29, further comprising displaying a list of task items in a task list user interface.

32. The computer storage medium of claim 29, wherein receiving the first selection of the task flagging control includes receiving a start date property for application to the data item.

33. The computer storage medium of claim 32, wherein receiving the start date property for application to the data item includes receiving the start date property from the context menu containing at least one start date property.

34. The computer storage medium of claim 33, further comprising populating the task flagging control with a visual icon for identifying the start date property applied to the data item.

35. The computer storage medium of claim 29, wherein receiving the selection of the task flagging control includes receiving a task category property for application to the data item.

36. The computer storage medium of claim 35, wherein receiving the task category property for application to the data item includes receiving the task category property from the context menu containing at least one task category property.

* * * * *